US012240260B2

(12) United States Patent
Humenick et al.

(10) Patent No.: US 12,240,260 B2
(45) Date of Patent: Mar. 4, 2025

(54) DYE SUBLIMATION APPARATUS WITH A MULTI-ZONE INDEPENDENT HEATER CONTROL

(71) Applicant: Sekisui Kydex, LLC, Bloomsburg, PA (US)

(72) Inventors: Jeffrey Humenick, Bloomsburg, PA (US); Jym Kauffman, Bloomsburg, PA (US); Rebecca Gallup, Bloomsburg, PA (US)

(73) Assignee: Sekisui Kydex, LLC, Bloomsburg, PA (US)

( * ) Notice: Subject to any disclaimer, the term of this patent is extended or adjusted under 35 U.S.C. 154(b) by 0 days.

(21) Appl. No.: 17/855,490

(22) Filed: Jun. 30, 2022

(65) Prior Publication Data

US 2023/0001728 A1 Jan. 5, 2023

Related U.S. Application Data

(60) Provisional application No. 63/217,724, filed on Jul. 1, 2021.

(51) Int. Cl.
*B41M 5/035* (2006.01)
*B41F 16/00* (2006.01)
*B41J 2/325* (2006.01)

(52) U.S. Cl.
CPC ....... *B41M 5/0358* (2013.01); *B41F 16/0006* (2013.01); *B41J 2/325* (2013.01); *B41J 2202/30* (2013.01)

(58) Field of Classification Search
CPC B41M 5/0358; B41F 16/0006; B41P 2219/31
See application file for complete search history.

(56) References Cited

U.S. PATENT DOCUMENTS 5,644,351 A 7/1997 Matsumoto et al.
5,997,677 A * 12/1999 Zaher .................. B41M 5/0358 101/492

(Continued)

FOREIGN PATENT DOCUMENTS

DE 102015212279 A1 * 2/2016 .............. B41F 19/02
EP 1468828 A2 * 10/2004 .............. B41F 16/00

(Continued)

OTHER PUBLICATIONS

International Search Report and Written Opinion on PCT Appl. Ser. No. PCT/US2022/035504 dated Oct. 5, 2022 (10 pages).

*Primary Examiner* — Jill E Culler
(74) *Attorney, Agent, or Firm* — Foley & Lardner LLP

(57) ABSTRACT

An illustrative dye sublimation apparatus may include a heating surface that may have multiple zones. Each zone may include a single individually controlled heater. A controller may control the heater to generate a range of heat and not merely turn the heater ON and OFF. Therefore, one or more controllers may individually regulate heat from corresponding heaters in the zones thereby maintaining a constant and nearly constant temperature throughout the bed of the dye sublimation apparatus in the heating surface. Furthermore, one or more controllers may maintain a first range of temperature during a first state of a dye sublimation process and a second range of temperature during a second stage of the dye sublimation process.

20 Claims, 9 Drawing Sheets

(56) References Cited

U.S. PATENT DOCUMENTS

| | | | | |
|---|---|---|---|---|
| 11,407,245 | B1 * | 8/2022 | Dalton | B41F 16/0086 |
| 2002/0113857 | A1 | 8/2002 | Jimbo | |
| 2002/0131062 | A1 * | 9/2002 | Neri | B44C 1/1712 358/1.9 |
| 2004/0165055 | A1 | 8/2004 | Clifton et al. | |
| 2011/0229664 | A1 | 9/2011 | Hoggard | |
| 2012/0196085 | A1 | 8/2012 | Langan et al. | |
| 2015/0029289 | A1 | 1/2015 | Rosner et al. | |
| 2017/0246881 | A1 | 8/2017 | Inokuchi et al. | |
| 2022/0118757 | A1 * | 4/2022 | Li | B41F 19/068 |

FOREIGN PATENT DOCUMENTS

| | | | | |
|---|---|---|---|---|
| GB | 2583976 | A * | 11/2020 | B41F 16/0046 |
| WO | WO-2007049070 | A1 * | 5/2007 | B41F 16/00 |
| WO | WO-2020/162958 | A1 | 8/2020 | |

* cited by examiner

DYE SUBLIMATION APPARATUS WITH A MULTI-ZONE INDEPENDENT HEATER CONTROL

CROSS-REFERENCE TO RELATED APPLICATIONS

This application claims the benefit of and priority to U.S. Provisional Application No. 63/217,724, filed Jul. 1, 2021, the entire disclosure of which is incorporated by reference herein.

TECHNICAL FIELD

This application is directed generally towards a dye sublimation apparatus and more specifically towards independently controlled heaters of a heating surface of the dye sublimation apparatus.

BACKGROUND

Dye sublimation is a process of infusing images to a substrate. An image to be infused is printed on a paper (or any type of sheet) using sublimation dyes (contained in the sublimation inks) and the printed paper is pressed against a substrate (generally a thermoplastic material) under heat. The heat causes the dyes to sublimate from a solid state on the printed paper to a gaseous state to travel into the substrate, where the dyes are deposited as solids. This sublimation process therefore infuses the image from the printed paper into the substrate. As the infused image is embedded into the substrate rather than applied at a topical level, the image may not chip, fade, or delaminate like capped and printed images.

A dye sublimation apparatus has a heating surface to generate the heat for sublimating the dyes. The heating surface includes one or more zones, each zone containing multiple heaters with a linked control. Therefore, all the heaters in a zone are controlled as a combined unit. For example, FIG. 1 shows a conventional heater arrangement 100 on a heating surface of a conventional dye sublimation apparatus. As shown, the heater arrangement 100 include heaters 102*a*-102*n* arranged into six zones 104*a*, 104*b*, 104*c*, 104*d*, 104*e*, 104*f*. Heaters 102*a*, 102*b*, 102*c* may therefore have a linked control because all these heaters are in the same zone 104*a*. Even within the same zone 104*a*, the heaters 102*a*, 102*b*, 102*c* can merely be turned OFF and ON collectively. A controller controlling the heat generated from each of the zones 104*a*-104*f* may utilize the temperature reading from a thermocouple 106 for control the amount of heat from the zones 104*a*-104*f* by turning the corresponding zone OFF or ON.

FIG. 2 shows another example of conventional heater arrangement 200 containing multiple heaters arranged in multiple zones 202*a*-202*n*. A controller may use temperature readings from a thermocouple 204 to control the heat generated by each of the zone 202*a*-202*n* by turning a corresponding zone OFF or ON. However, such linked control causes the heating arrangement 200 to generate an uneven temperature distribution. For example, zone 202*a* may be generate heat at 640° F. and zone 202*b* may generate heat at 630° F. The unevenness of temperature may be due to the fact that the heaters, although identical, may not generate the same amount of heat.

The uneven temperature distribution produced by conventional heater arrangements may generate an uneven infused image into the substrate. A larger amount of dyes may sublimate and deposit at zones with higher temperature compared to the zones with lower temperatures where a smaller amount of dyes may sublimate and deposit. The quality of the infused image may therefore suffer because of the unevenness of the temperature. In other words, the conventional heater arrangement may generate a substrate containing an infused image with dark areas with more dyes and light areas with less dyes.

SUMMARY

What is therefore desired is an improvement upon the heaters for dye sublimation. Embodiments described herein attempt to solve the aforementioned technical problems, such as uneven temperature distribution, and may provide other solutions as well. An illustrative dye sublimation apparatus may include a heating surface that may have multiple zones. Each zone may include one or more individually (or independently) controlled heaters. A controller may control the heater to generate a range of heat and not merely turn the heater ON and OFF. Therefore, one or more controllers may individually regulate heat from corresponding heaters in the zones thereby maintaining a constant and nearly constant temperature throughout the bed of the dye sublimation apparatus in the heating surface. Furthermore, one or more controllers may maintain a first range of temperatures during a first state of a dye sublimation process and a second range of temperatures during a second stage of the dye sublimation process.

In one embodiment, a dye sublimation apparatus for infusing an image on a printed sheet to a substrate comprises a heating surface comprising a plurality of zones, wherein the heating surface is configured to radiate heat on the printed sheet to sublimate one or more dyes forming the image, such that the one or more dyes travel into the substrate in a gaseous state and deposit into the substrate in a solid state to infuse the image into the substrate; and one or more controllers configured to individually regulate heat from each of the plurality of zones, wherein each of the plurality of zones comprises an individually regulated heater.

In another embodiment, a method for infusing an image on a printed sheet to a substrate through dye sublimation comprises heating, by a plurality of heaters on a heating surface of a dye sublimation apparatus, the printed sheet to sublimate one or more dyes forming the image, such that the one or more dyes travel into the substrate in a gaseous state and deposit into the substrate in a solid state to infuse the image into the substrate, the heating surface comprising a plurality of zones wherein each of the plurality of zones comprises a heater; and regulating, by one or more controllers of the dye sublimation apparatus, heat from each of the plurality of zones.

It is to be understood that both the foregoing general description and the following detailed description are exemplary and explanatory and are intended to provide further explanation of the disclosed embodiment and subject matter as claimed.

BRIEF DESCRIPTION OF THE DRAWINGS

The accompanying drawings constitute a part of this specification and illustrate embodiments of the subject matter disclosed herein.

DETAILED DESCRIPTION

Figure 1:
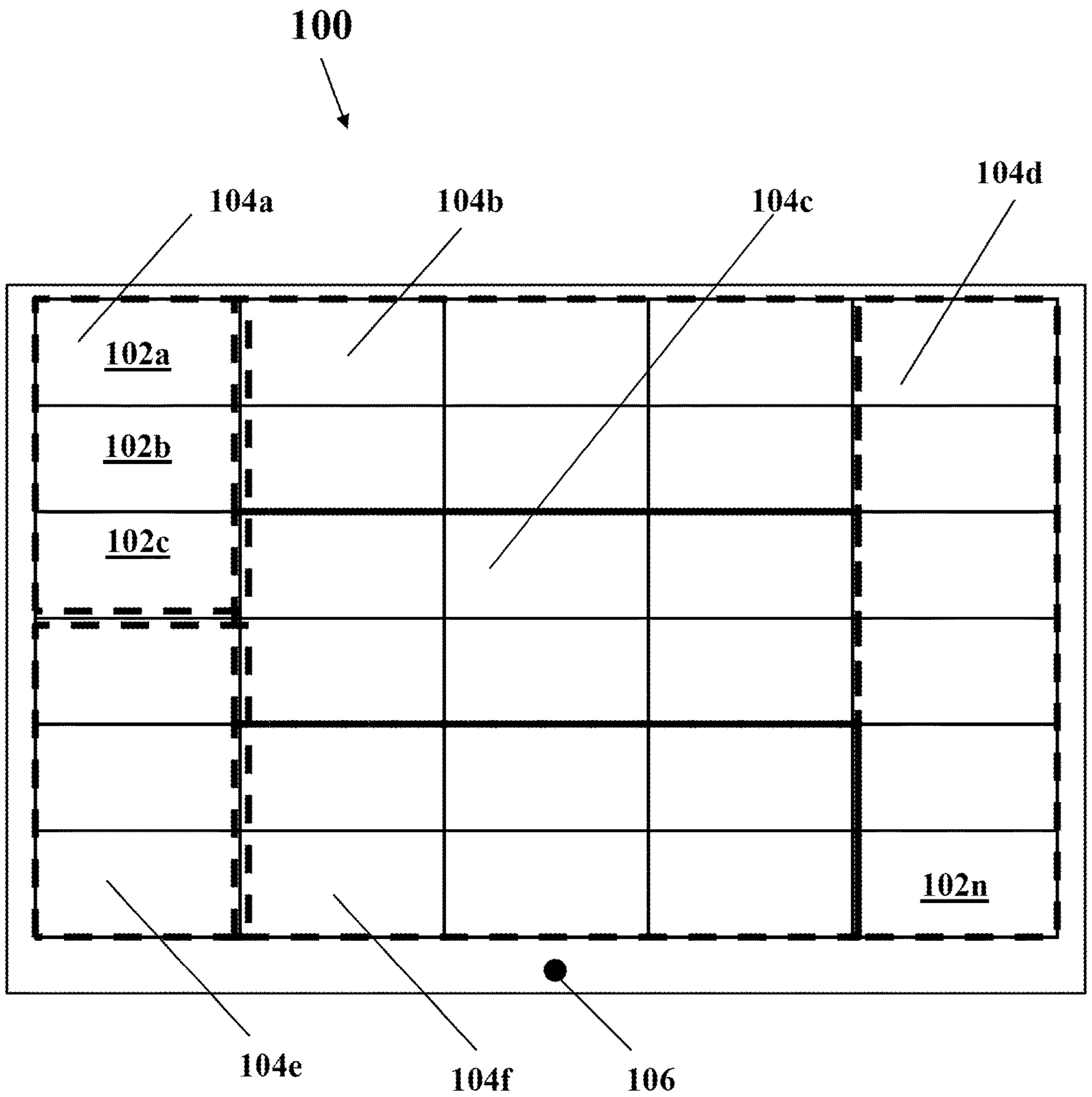
FIG. 1 PRIOR ART
FIG. 1 shows a first example of a conventional heating arrangement of a conventional dye sublimation apparatus.
Figure 2:
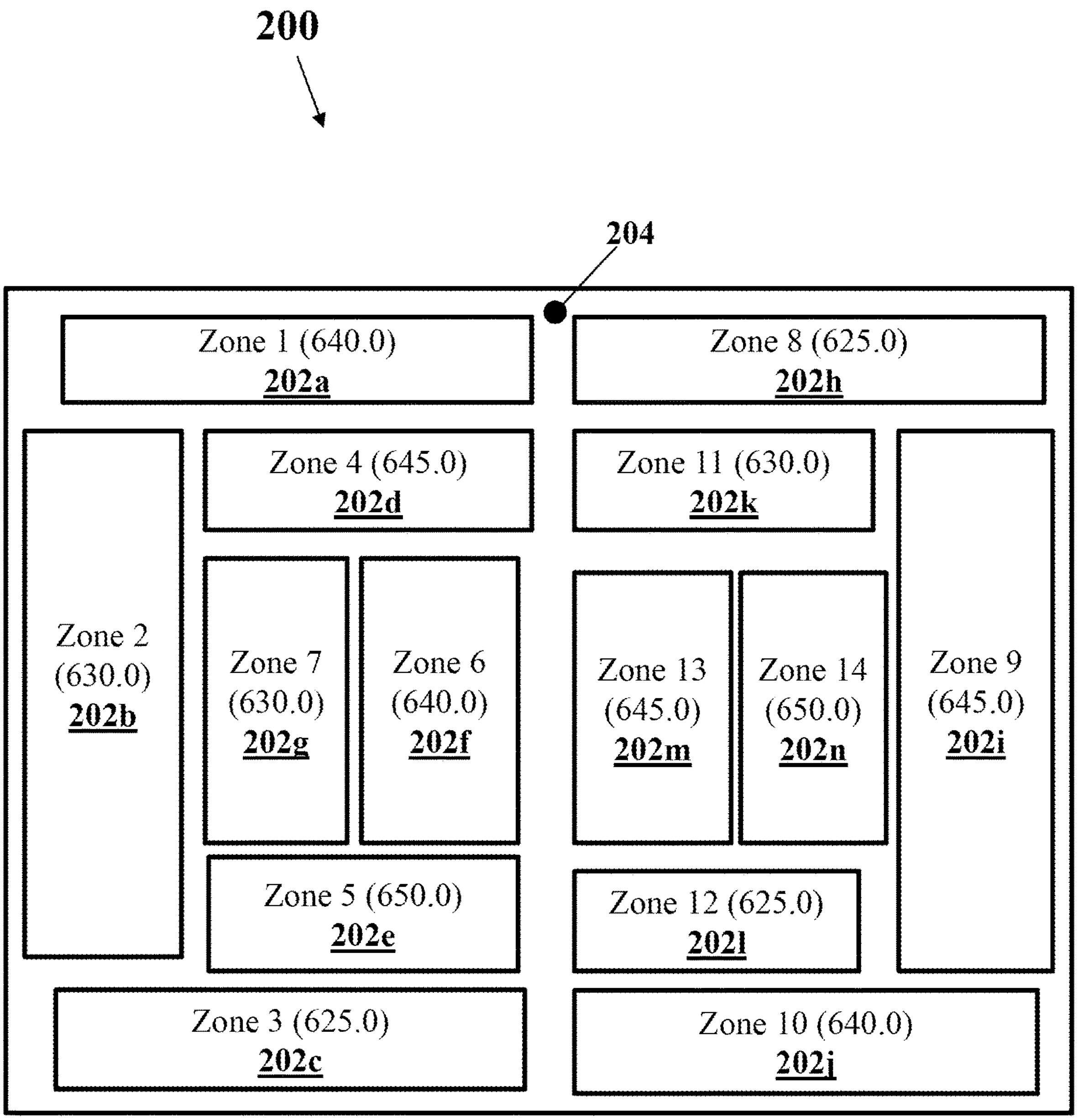
FIG. 2 PRIOR ART
FIG. 2 shows a second example of a conventional heating arrangement of a conventional dye sublimation apparatus.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein describe systems and methods for generating and controlling heat from a heating surface of a dye sublimation apparatus. The heating surface may include a heater configuration having a plurality of heaters (e.g., electrical heaters). The heating surface may be divided into individually (or independently) controlled zones, each zone containing at least one heater. One or more controllers may regulate the heat generated from each zone. A temperature sensor such as a thermocouple may provide a temperature feedback to the one or more controllers for regulating the heat. The controllers may regulate the heat from each zone and consequently cause each heater to maintain a constant or near constant bed temperature within the heating surface of the dye sublimation apparatus to generate a uniform quality infused image. In some embodiments, the controllers may cause (or instruct) the heaters to maintain a first bed temperature at a first stage of the dye sublimation process and a second bed temperature at a second stage of the dye sublimation process.

It should however be understood that the several configurations of the heating surface described throughout this disclosure are for illustration only and should not be considered limiting. This disclosure therefore includes any type of distribution of independently controlled heaters on a heating surface of a dye sublimation apparatus.

Figure 3:
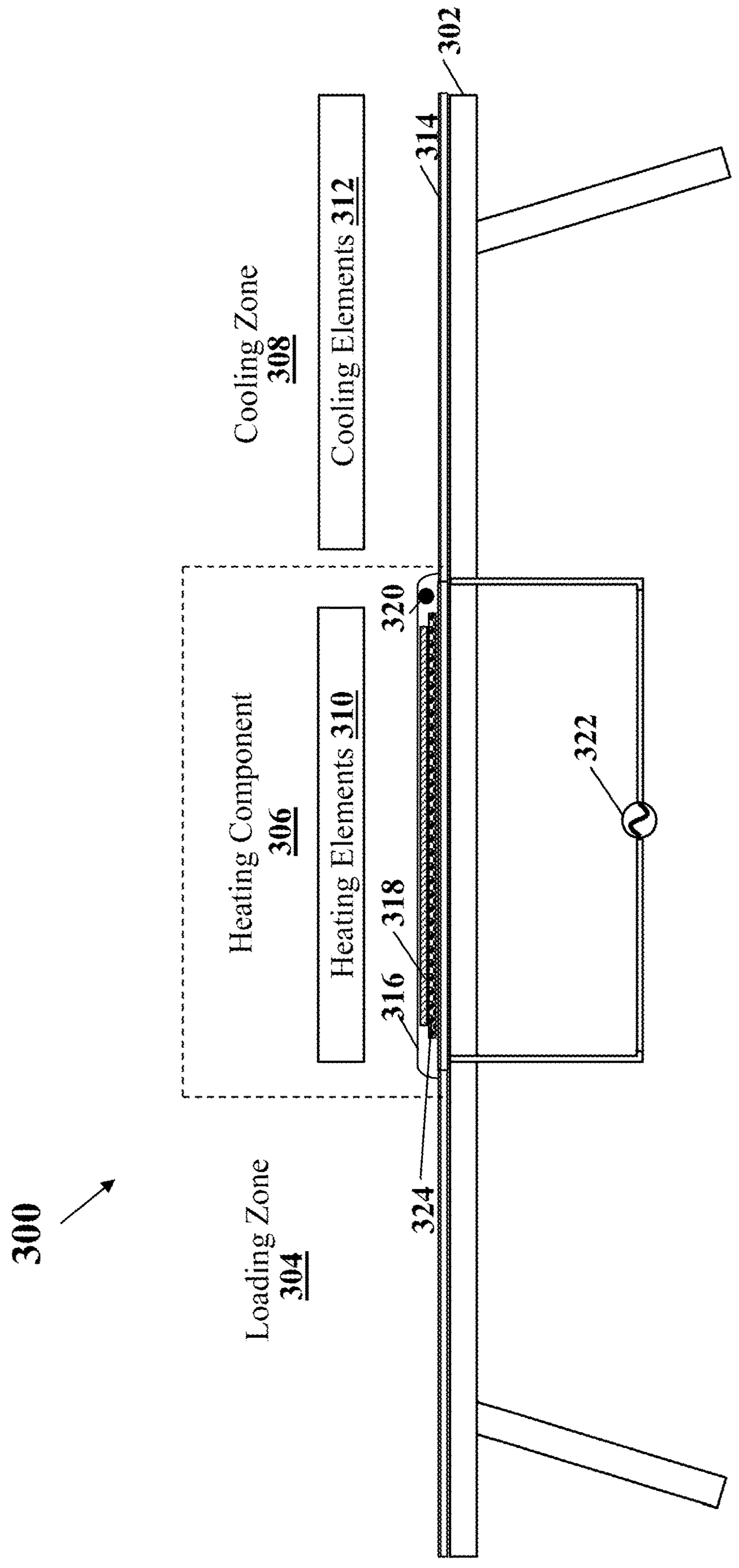
FIG. 3 shows a dye sublimation machine, according to an embodiment.

FIG. 3 shows an illustrative dye sublimation machine (also referred to as dye sublimation apparatus) 300, according to an embodiment. It should be understood that the dye sublimation machine 300 shown in FIG. 3 and described herein is merely for illustration and explanation and machines with other form factors and components should also be considered within the scope of this disclosure. For example, dye sublimation machines having additional, alternative, or a fewer number of components than the illustrative dye sublimation machine 300 should be included within the scope of this disclosure.

The dye sublimation machine 300 may comprise a sublimation table 302, which may provide structural support for the components of the dye sublimation machine 300. The dye sublimation machine 300 and/or the sublimation table 302 may be divided into three zones: a loading component (also referred to as a loading zone) 304, a heating component 306, and a cooling component (also referred to as a cooling zone) 308. The loading zone 304 may allow a worker (or a user) to load a printed sheet 318 and a substrate 324. The printed sheet 318 may have an image printed thereon using sublimation inks containing sublimation dyes. The substrate 324 may be of any type of material such as thermoplastic where the image may be infused through the dye sublimation process. The combination of the printed sheet 318 and the substrate 324 may be loaded onto a bed 314 at the loading zone 304. The bed 314 may be formed by a graphite honeycomb structure. The bed 314 may be configured as a conveyer belt that moves through the loading zone 304, the heating zone 306, and the cooling zone 308.

The heating component 306 includes a heating surface having a plurality of heating elements 310, and the heating surface may be in an enclosure or on a portion of the dye sublimation machine 300. The heating elements 310 may include heating coils in any type of configuration. The heating elements 310 may be electrically heated providing a radiative type heating to the combination of the printed sheet 318 and the substrate 324. For example, the heating elements 310 may be included in multiple electrical heaters, each heating a portion of the combination of the printed sheet 318 and the substrate. The heating component 306 may also include a temperature sensor 320 (e.g., a thermocouple) to measure the temperature of the heat generated by the heating elements 310. The heating elements 310 may be within individual heaters that may be individually controlled by one or more controllers. For example, a controller associated with a heater may receive a temperature measurement from the temperature sensor 320 and determine the amount of heat to be radiated by the heater. The heating elements 310 may also be divided into a plurality of zones, each zone containing a single heater. Therefore, a corresponding controller may individually control the heat output of each zone to maintain a consistent temperature at the bed 314 within the heating component 306. Within the heating component 306, a membrane 316 may cover the combination of the printed sheet 318 and the substrate 324. The membrane 316 may be formed by any kind of material that may withstand the heat for repeated heating cycles in the heating zone 306. A vacuum pump 322 may pull down the membrane 316 such that the membrane 316 may cover the combination of the printed sheet 318 and the substrate 324 snugly without air bubbles.

The cooling zone 308 may cool down the combination of the printed sheet 318 and the substrate 324 after the dye sublimation process in the heating component 306. The cooling zone 308 may include cooling elements 312, such as cold air blowers, to expedite the cooling down process. However, it should be understood that the cooling zone 308 may not necessarily include the cooling elements 312 and the substrate 324 may cool down to ambient temperature without the aid of the cooling elements 312. It should also be understood that the loading zone 304 and the cooling zone 308 may be combined in some embodiments. In these embodiments, the combination of the printed sheet 318 and the substrate 324 may be placed on the combined zone providing both loading and cooling functionality, be moved to the heating component 306, and moved back to the combined zone for cooling. Therefore, it should generally be understood that the configuration of FIG. 3 is merely illustrative and alternative configurations should also be considered within the scope of this disclosure.

In an illustrative operation, a worker may place the substrate 324 on the loading zone 304 and place the printed sheet 318 directly on the substrate 324. The bed 314 may be configured as a conveyer belt, which may move the combination of the printed sheet 318 and the substrate 324 to the heating component 306. The heating component 306 may be a covered area within the dye sublimation machine 300. Within the heating component 306, the vacuum pump 322 may pull a vacuum between the membrane 316 and the bed 314 such that the membrane 316 presses down on the printed sheet 318. The heating elements 310 may generate a requisite amount of heat to sublimate the ink on the printed sheet 318. The sublimated ink may then be deposited into the substrate 324. The temperature sensor 320 may measure the temperature within the enclosure created by the membrane 316 and the bed 314 and the temperature measurement may be used by the heating elements to regulate the generated heat. After the combination of the printed sheet 318 and the substrate 324 are left in the heating component 306 for a requisite amount of time (e.g., based upon the properties of the substrate 324), the combination of the printed sheet 318 and the substrate 324 is moved to the cooling zone. As described above, the loading zone 304 may also function as the cooling zone 308. The cooling process in the cooling zone 308 may be expedited by the cooling elements 312, which may provide an active source of cooling such as a flow of cold air. After the combination of the printed sheet 318 and the substrate 324 is sufficiently cooled, the combination is removed from the dye sublimation machine 300. After this process, the image in the printed sheet 318 may be infused (or deposited) into the substrate 324.

Figure 4:
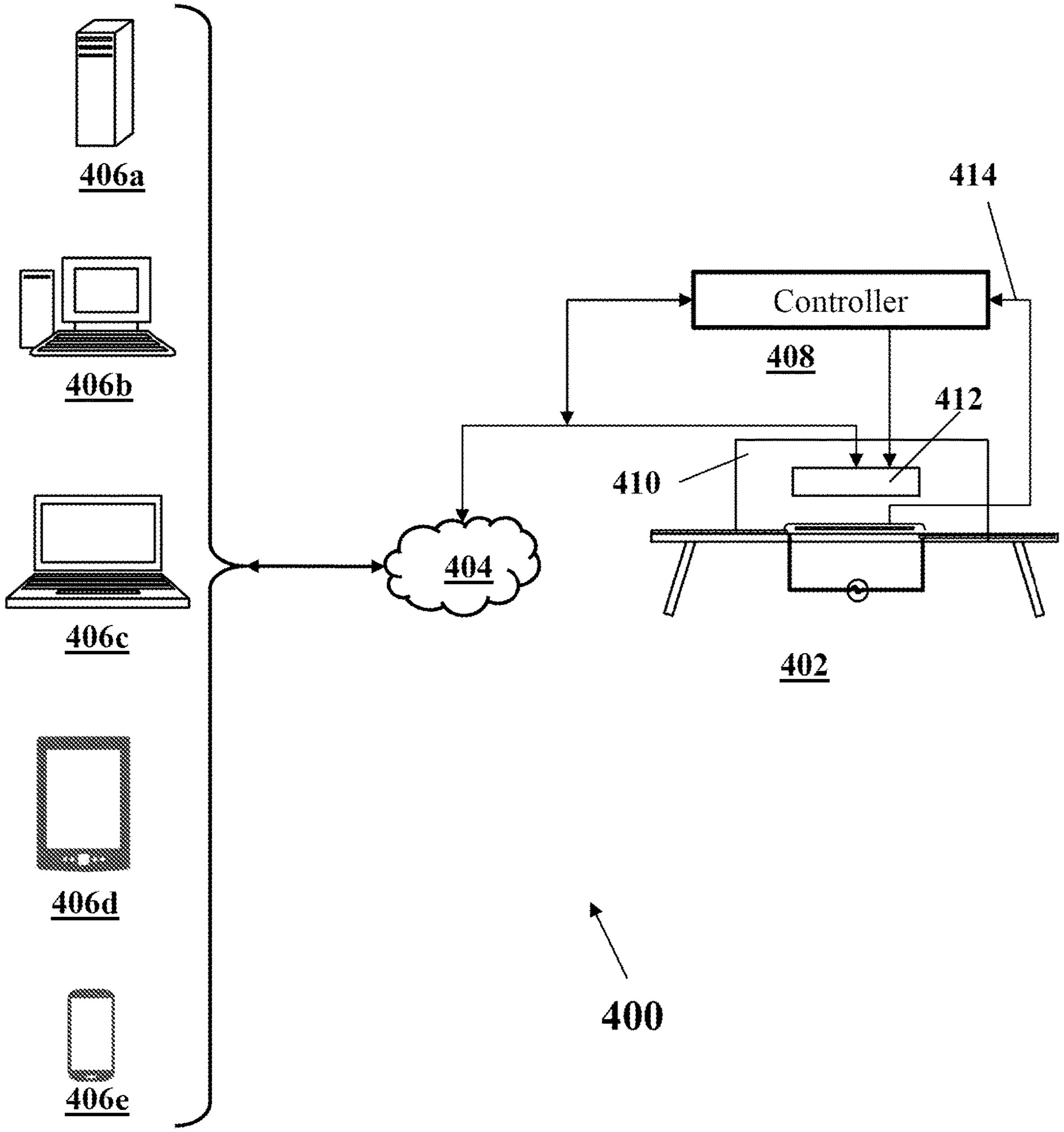
FIG. 4 shows a system for printing a paper with an image for dye sublimation, according to an embodiment.

FIG. 4 shows an illustrative system 400 for dye sublimation, according to an embodiment. As shown, the system 400 may comprise a dye sublimation apparatus (also referred to as a dye sublimation machine) 402, a network 404, computing devices 406*a*, 406*b*, 406*c*, 406*d*, 406*e* (collectively or commonly referred to as 406), and a controller 408. It should be understood that the system 400 and the aforementioned components are merely for illustration and systems with additional, alternative, and a fewer number of components should be considered within the scope of this disclosure.

The dye sublimation apparatus 402 may be a combination of components that may infuse (or dye sublimate) an image from a printed sheet to a substrate. The image may be printed using sublimation inks containing sublimation dyes that may transform from solid state to gaseous state when heated to a predetermined temperature. The sublimation dyes may travel into the substrate and deposit thereon thereby creating an infused image into the substrate. For the heating part of the dye sublimation process, the dye sublimation apparatus 402 may include a heating component 410. The heating component may generally be enclosed for temperature control and to preempt the heat escaping the dye sublimation apparatus 402. The heating component 410 may include a heating surface having heaters 412, which may be organized into different zones with each zone containing at least one heater.

The heaters 412 may be controller by a controller 408. The single controller 408 is shown merely for illustration and there may be a plurality of controllers 408 controlling the heaters 412. More particularly, the controller 408 may regulate the heat generated by each zone (containing at least one heater) individually. For example, the controller 408 may increase the heat, decrease the heat, turn ON, or turn OFF the heat generated by a zone by controlling the corresponding heater. The controller 408 may be any kind of hardware and/or software controller, including, but not limited to PID (proportional-integral-derivative) controller and/or any other type of controller. The controller 408 may continuously receive a feedback from the items being heated (e.g., printed sheet, substrate) through a connection 414. The connection 414 may be wired, e.g., a thermocouple providing the feedback to the controller 408, or wireless, e.g., a wireless temperature sensor wirelessly providing the feedback to the controller 408.

In addition to the controller 408, the heaters 412 may be controlled based upon instructions provided by a computing device 406. For example, the computing device 406 may include an interface for a user to enter a desired amount of bed temperature in the heating component 410 for a particular image and the computing device 406 may provide instructions to the heaters 412 through the network 404 to maintain the temperature. Alternatively or additionally, the computing device 406 may provide the instruction to maintain the temperature to the controller 408. In some embodiments, the computing device 406 may provide instructions to the array of heaters 412 to maintain a first temperature at a first stage of the dye sublimation process and to maintain a second temperature at a second stage of the dye sublimation process. It should be understood that the instructions to maintain the temperature and the process of maintaining the temperature may be maintained either in hardware, e.g., through the controller 408, or as a combination of hardware and software, e.g., through one or more applications in the computing device 406, the controller 408, and/or other hardware components in the dye sublimation apparatus. In some embodiments, the controller 408 may sequentially activate the heaters in the array of heaters 412. For example, the dye sublimation process may require a gradual ramping up of the heat and therefore the sequential activation may allow heat to build up to a desired temperature. As another example, activating the heaters at the periphery of the heating component 410 first may allow a controller to determine an amount of heat (generally lesser than the heaters at the periphery) to be generated by heaters at the center of the heating surface 410 to maintain a desired temperature within the heating component 410.

The computing devices 406 may include any type processor-based device that may provide one or more instructions (e.g., instructions to maintain a desired temperature) to the dye sublimation apparatus 402 through the network 404. Non-limiting examples of the computing devices 406 include a server 406*a*, a desktop computer 406*b*, a laptop computer 406*c*, a tablet computer 406*d*, and a smartphone 406*e*. However, it should be understood that the aforementioned devices are merely illustrative and other computing devices should also be considered within the scope of this disclosure. At minimum, each computing device 406 may include a processor and non-transitory storage medium that is electrically connected to the processor. The non-transitory storage medium may store a plurality of computer program instructions (e.g., operating system, applications) and the processor may execute the plurality of computer program instructions to implement the functionality of the computing device 406.

The network 404 may be any kind of local or remote network that may provide a communication medium between the computing devices 406 and the dye sublimation apparatus 402. For example, the network 404 may be a local area network (LAN), a desktop area network (DAN), a metropolitan area network (MAN), or a wide area network (WAN). However, it should be understood that aforementioned types of networks are merely illustrative and any type of component providing the communication medium between the computing devices 406 and the dye sublimation apparatus 402 should be considered within the scope this disclosure. For example, the network 404 may be a single wired connection between a computing device 406 and the dye sublimation apparatus 402.

Figure 5:
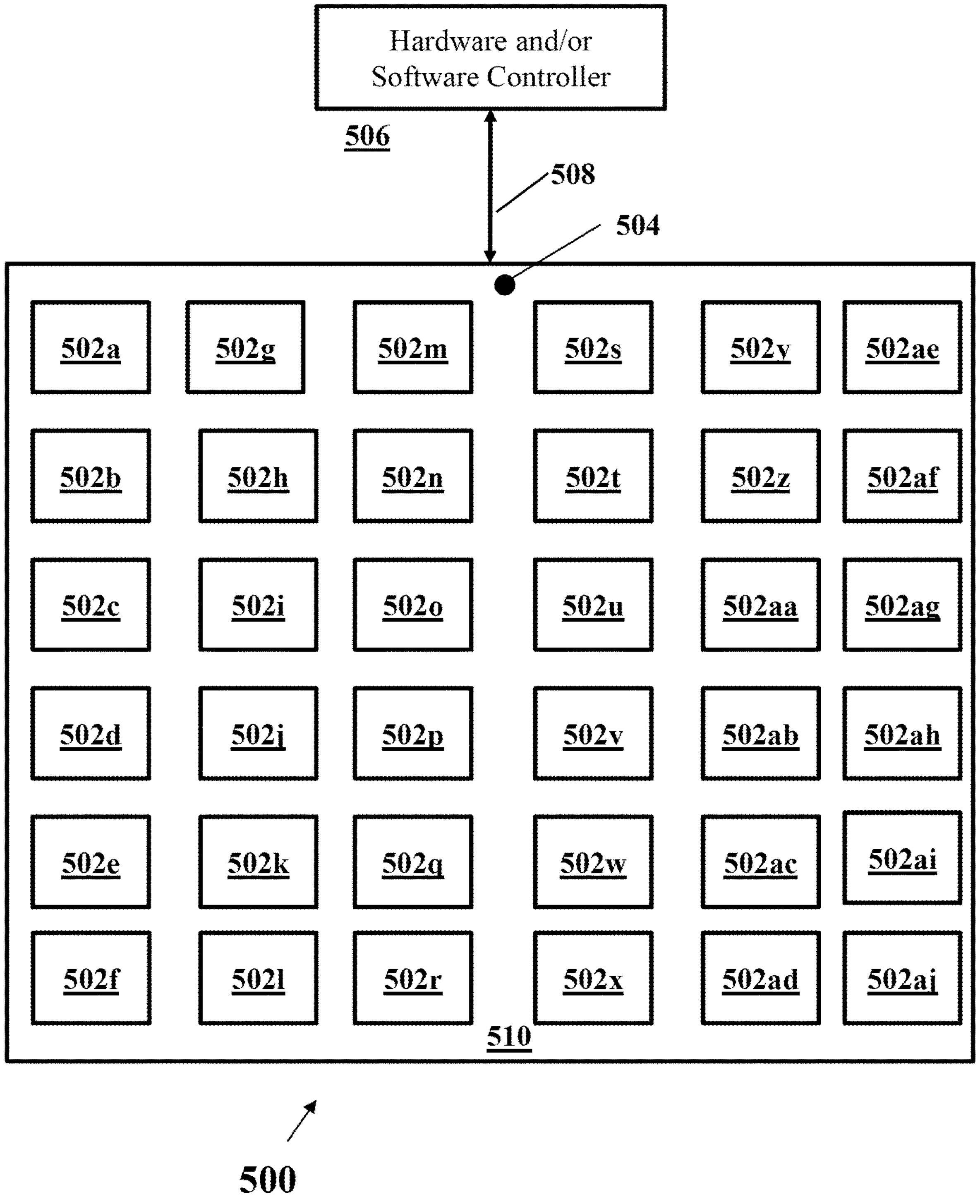
FIG. 5 shows an illustrative heater configuration on a heating surface of a dye sublimation apparatus, according to an embodiment.

FIG. 5 shows an illustrative heater configuration 500 in a dye sublimation apparatus, according to an embodiment. FIG. 5 shows a view of the heater configuration 500 as seen from the bed of a heating surface of a heating component of the dye sublimation apparatus. It should be understood that the heater configuration 500 shows in FIG. 5 is an illustrative grouping, arrangement, array, or bank of heaters and alternate heater configurations and having a higher number of heaters or a lower number of heaters should also be considered within the scope of this disclosure.

The heater configuration 500 may include a plurality of heaters 502*a*-502*aj* (collectively or commonly referred to as heaters 502) that may generate heat for a heating surface in the dye sublimation apparatus. The heaters 502 on a surface 510 may be divided into zones, wherein each zone may contain a single heater 502. Each zone and therefore the corresponding heater 502 may be controlled individually by a controller 506. The heaters 502 may be any kind of heater such as an electrical heater or an electrochemical heater. If they are electrical heaters, each of the heaters 502 may comprise a heating filament that may covert electrical energy to heat energy. The heat energy generated by the heating filament may be based upon the amount of electricity flowing through the heating filament. Therefore, the controller 506 may control the amount of the electricity flowing through the corresponding filament of each of the heaters 502 to regulate the overall heat generated by the heater configuration 500. By controlling each of the heaters 502 individually, the controller may maintain a predetermined temperature range in the heating zone of the dye sublimation apparatus.

In the illustrative configuration of FIG. 5, each zone contains a single heater 502. In alternative embodiments, each zone may have one or more heaters. In such a configuration, the controller may monitor each zone as a single temperature based on the combination of heaters in each zone (e.g., using a temperature representative of a zone). In some configurations of a zone having more than one heater, the zone may be configured with a plurality of sub-zones such that each sub-zone has a single heater. The controller may monitor and control the heat from the sub-zones and the zones.

The controller 506 may be any type of controller such as hardware controller and/or a software controller. For example, the controller 506 may be a hardware controller such as a PID controller. As an alternative or an addition, the controller 506 may be a software controller including one or more software modules that may receive instructions from other devices or an interface within the dye sublimation apparatus itself and control the heaters 502 based upon the received instructions. For example, a computing device connected to the dye sublimation apparatus may render an interface for a user to enter a desired temperature for a particular image to be infused into a substrate and the controller 506 may accordingly control the heaters 502 based upon the desired temperature. In some embodiments, the image infusion process through dye sublimation may include multiple stages with varying temperatures. In these embodiments, the controller 506 may control the heaters 502 to maintain a first temperature at a first stage and to maintain a second temperature at the second stage. For example, the image infusion process may require a lower temperature during an initial stage and require a higher temperature for a later stage. In some instances, the controller 506 may cause the heaters 502 near the center of the heater configuration 500 (e.g., heaters 502*o*, 502*p*, 502*u*, 502*v*) to operate at a lower temperature than the heaters 502 near the periphery of the heater configuration 500 (e.g., heaters 502*a*, 502*f*, 502*ae*, 502*aj*). To maintain a constant temperature within the heating zone, the heaters 502 near the center of the heater configuration 500 may have to generate a lesser amount of heat than the heaters 502 near the periphery of the heater configuration 500.

The controller 506 may regulate the heaters 502 based upon temperature measurements made by a temperature sensor 504. The temperature sensor 504 may be a thermocouple, for example. It should be understood that the temperature sensor 504 may not be within the heater configuration 500 itself and may be on the bed of the dye sublimation apparatus. For example, FIG. 5 shows an illustrative position of the temperature sensor 504 within the bed with respect to the heater configuration 500. The controller 506 may receive a temperature feedback (e.g., temperature measured by the temperature sensor 504) and provide instructions to the heaters through a connection 508. The connection 508 may be a wired connection or a wireless connection. For a wireless connection, the temperature sensor 504 may be wireless transmitting the measured temperature to the controller 506 wirelessly. For the wireless connection, the heater configuration 500 may include a wireless signal receiver to receive the instructions from the controller 506 wirelessly.

Figure 6:
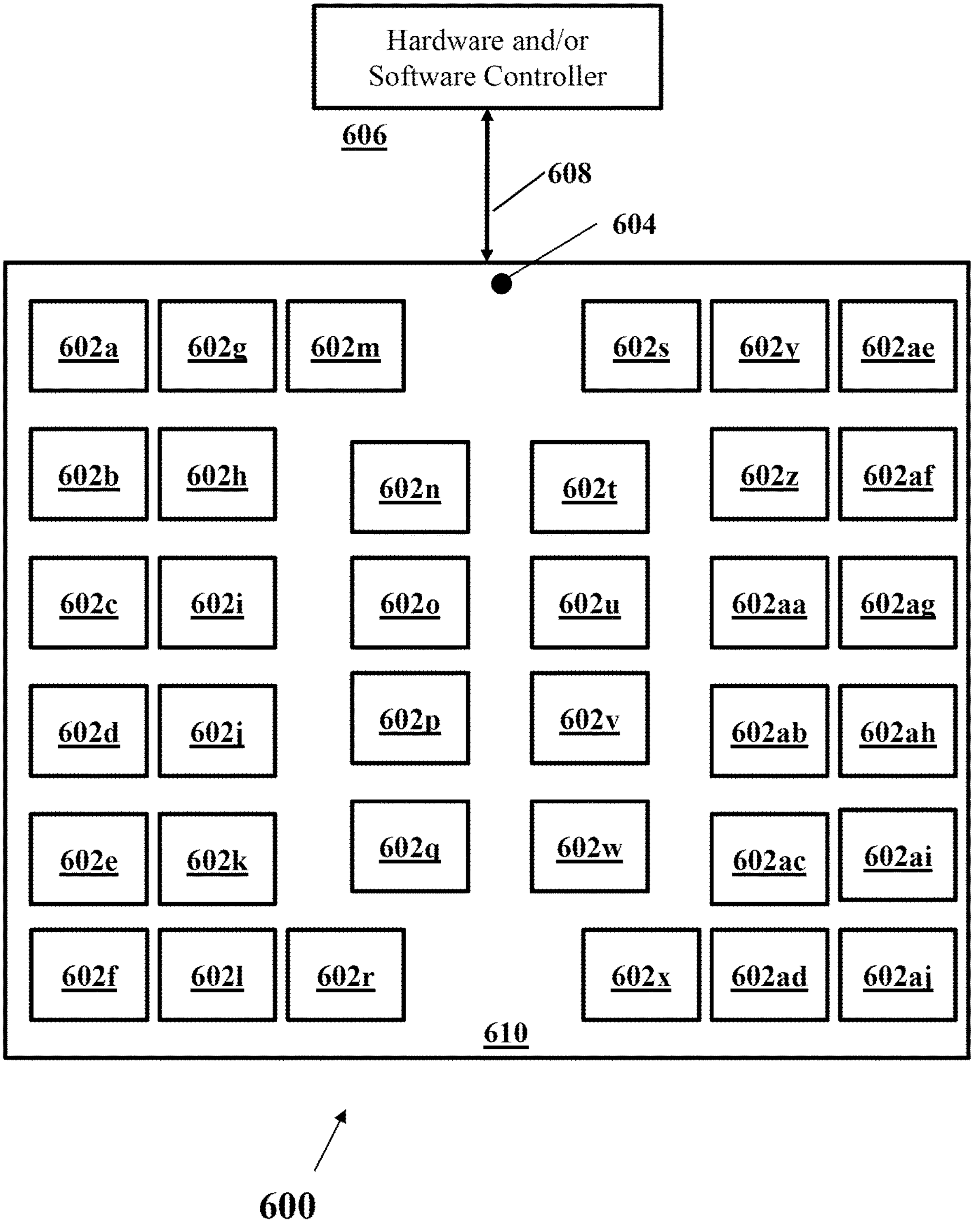
FIG. 6 shows an illustrative heater configuration on a heating surface of a dye sublimation apparatus, according to an embodiment.

As described above, the configuration of heaters 502 in the heater configuration 500 is merely illustrative, and alternative configurations should also be considered within the scope of this disclosure. FIG. 6 shows an illustrative heater configuration 600 with an alternative configuration of heaters 602*a*-602*aj* (collectively or commonly referred to as 602). FIG. 6 shows a view of the heater configuration 600 as seen from the bed of a heating component of the dye sublimation apparatus.

The heater configuration 600 may include a plurality of heaters 602 on a surface 610, wherein a higher number of heaters 602 are clustered near the periphery of the heater configuration 600. A lower number of heaters 602 (e.g., heaters 602*n*, 602*o*, 602*p*, 602*q*, 602*t*, 602*u*, 602*v*, 602*w*) are clustered near the center of the heater configuration 600. A controller 606, which may be a hardware and/or software controller, may individually regulate the heat generated by each of the heaters 602. The heaters 602 may be electric heaters and the amount of heat generated by each heater may be based upon the electrical current flowing through the corresponding heating element. Therefore, the controller 606 may regulate the heat by regulating the flow of current through each of the heaters. The temperature feedback to the controller 606 may be provided by a temperature sensor 604.

A connection 608, which may be a wired or a wireless connection may provide the measurement of the temperature sensor 604 to the controller 606. The connection 608 may also carry the instructions or control signals generated by the controller 606 to the heater configuration 600, which may then be transmitted to the corresponding heater 602.

In the illustrative heater configuration 600, the heaters 602 and therefore the zones may not be uniformly arranged. As described above, the center of the heater configuration 600 has a lower concentration of heaters 602 than the periphery of the heater configuration 600. A lower number of heaters 602 (therefore a lower number of zones) may be sufficient to maintain a desired temperature at the center of the heater configuration 600 compared to the periphery. For example, heat generated by the heaters 602 near the periphery of the heater configuration 600 may radiate to the center of the heater configuration 600 while the heat generated by the heaters 602 near the center may not necessarily radiate to the periphery. Furthermore, the periphery of the heater configuration 600 may include heat sinks or other components that may operate as heat sinks. Therefore, a large number or a large concentration of heaters may be desired at the periphery and a fewer number of heaters and a small concentration of heaters may be desired at the center. It should be understood that the heater configuration 600, despite a non-uniform configuration of heaters may maintain a constant temperature within the corresponding heating zone.

Figure 7:
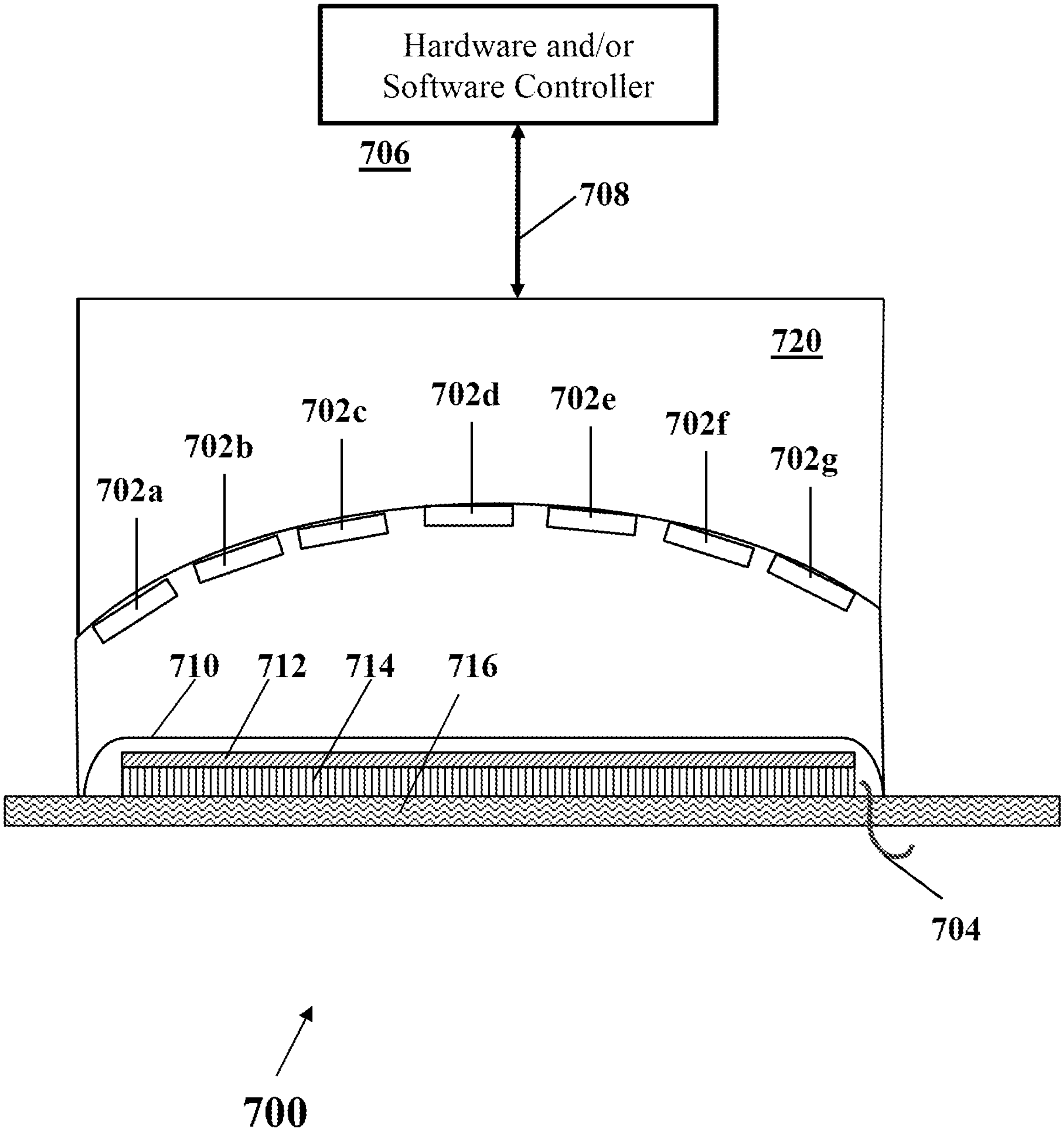
FIG. 7 shows an illustrative heating component of a dye sublimation apparatus, according to an embodiment.

It should also be understood that the heaters 602 may not necessarily be configured to be on a single plane but may have alternative configurations as well. For example, FIG. 7 shows a cross-section view of a heating surface 700 of a dye sublimation apparatus where the heaters 702*a*, 702*b*, 702*c*, 702*d*, 702*e*, 702*f*, 702*g* (collectively or commonly referred to as 702) on a convex surface 720 with respect to the bed 716 of the dye sublimation apparatus.

Within the heating component 700, a printed sheet 712 may be abutted to a substrate 714 on the bed 716. The printed sheet 712 may include an image printed with sublimation ink containing sublimation dyes. The sublimation dyes may change into gaseous form when heated by the heaters 702 and travel into the substrate 714. The dyes may then get deposited as solids into the substrate 714 thereby infusing the image into the substrate 714. The bed 716 may be a conveyer belt that may move the combination of the printed sheet 712 and the substrate 714 into the heating component 700 and out of the heating component 700 for cooling. A membrane 710 may snugly cover and exert a downward pressure on the combination of the printed sheet 712 and the substrate 714. The membrane 710 may be pulled onto the bed 716 using a vacuum pump (not shown). A temperature sensor 704 (e.g., a thermocouple) may continuously measure the temperature of the heating component 700 and provide the measurement to a controller 706 through a connection 708. The connection 708 may be any type of wireless or wired connection.

The controller 706 may include any kind of hardware and/or software controller. For example, the controller 706 may be a PID controller providing control signals to the heaters 702 through the connection 708. As another example, the controller 706 may include software modules that may provide control instructions to the heaters 702 through the connection 708.

The convex configuration of the heaters 702 may help the controller 706 maintain a constant or nearly constant temperature in the heating component 700. For example, the heat generated by each of the heaters 702 may be directed toward the combination of the printed sheet 712 and the substrate 714. Furthermore, heat from the heaters at the periphery (e.g., heaters 702*a*, 702*g*) may not necessarily get lost to the components surrounding the heating component 700. Moreover, as the center heaters (e.g., heaters 702*c*, 702*d*, 702*e*) are further away from the combination of peripheral heaters, the likelihood of the center part of the combination of the printed sheet 712 and the substrate 714 being overheated is minimized.

Figure 8:
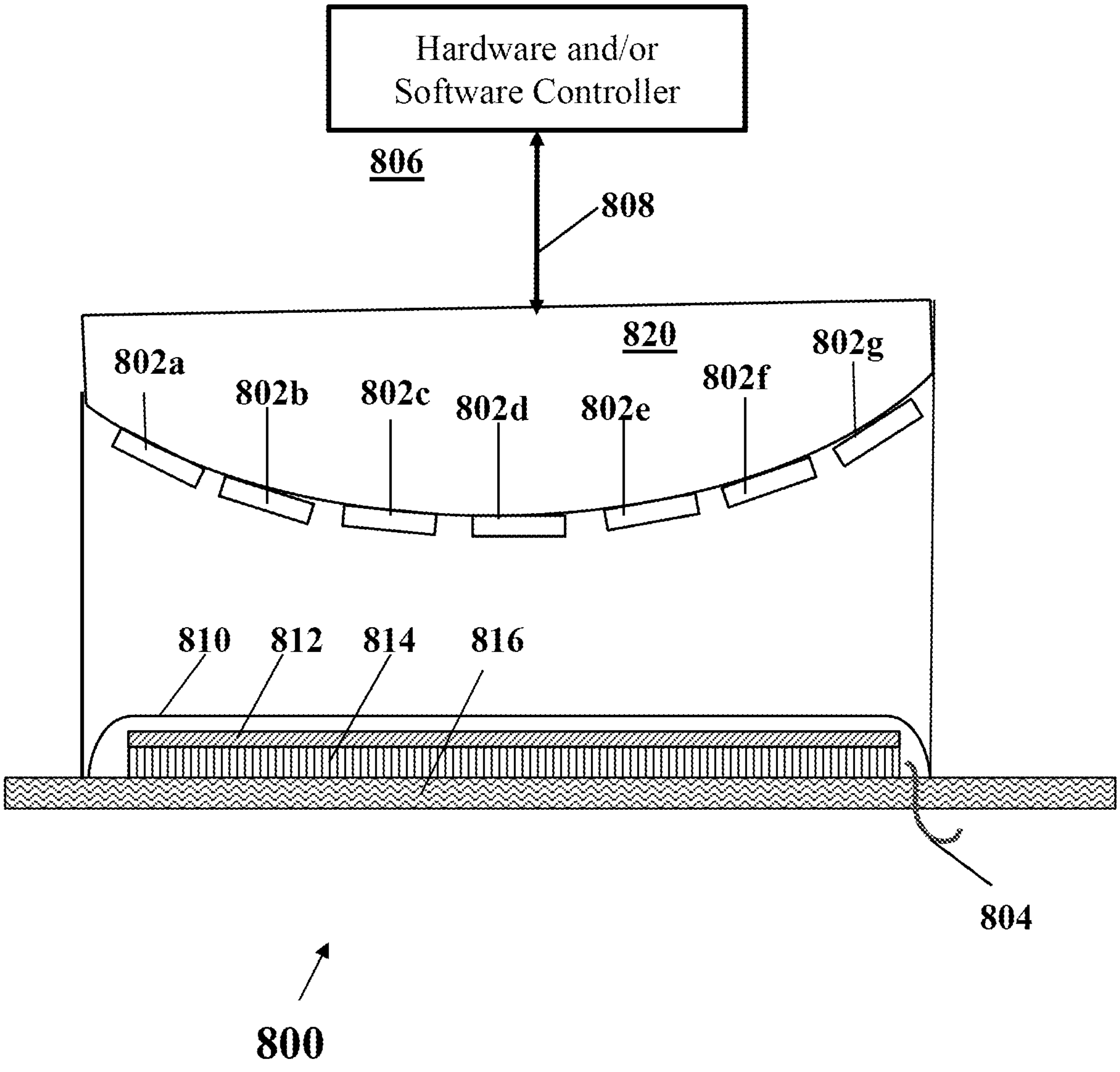
FIG. 8 shows an illustrative heating component of a dye sublimation apparatus, according to an embodiment.

However, it should be understood that the configuration of heaters 702 shown in FIG. 7 is merely illustrative and other configurations should be considered within the scope of this disclosure. For example, FIG. 8 shows an illustrative heating component 800 with an alternate configuration of heaters 802*a*, 802*b*, 802*c*, 802*d*, 802*e*, 802*f*, 802*g* (collectively or commonly referred to as 802). As shown, the heaters 802 may be arranged on a concave surface 820 with respect to the bed 816 of a dye sublimation apparatus.

Within the heating component 800, a printed sheet 812 may be abutted to a substrate 814 on the bed 816. The printed sheet 812 may include an image printed with sublimation ink containing sublimation dyes. The sublimation dyes may change into gaseous form when heated by the heaters 802 and travel into the substrate 814. The dyes may then get deposited as solids into the substrate 814 thereby infusing the image into the substrate 814. The bed 816 may be a conveyer belt that may move the combination of the printed sheet 812 and the substrate 814 into the heating component 800 and out of the heating component 800 for cooling. A membrane 810 may snugly cover and exert a downward pressure on the combination of the printed sheet 812 and the substrate 814. The membrane 810 may be pulled onto the bed 816 using a vacuum pump (not shown). A temperature sensor 804 (e.g., a thermocouple) may continuously measure the temperature of the heating component 800 and provide the measurement to a controller 806 through a connection 808. The connection 808 may be any type of wireless or wired connection.

The controller 806 may include any kind of hardware and/or software controller. For example, the controller 806 may be a PID controller providing control signals to the heaters 802 through the connection 808. As another example, the controller 806 may include software modules that may provide control instructions to the heaters 802 through the connection 808.

The illustrative configuration of heaters 802 on a concave surface with respect to the bed 816 may allow a uniform distribution of heat to the combination of the printed sheet 812 and the substrate 814. For example, the central heaters 802*c*, 802*d*, 802*e* may generate a majority of the heat that may radiate near the periphery of the heating section. The peripheral heaters 802*a*, 802*g* may then generate additional heat that may maintain the periphery at substantially the same temperature of the heating component 800.

Figure 9:
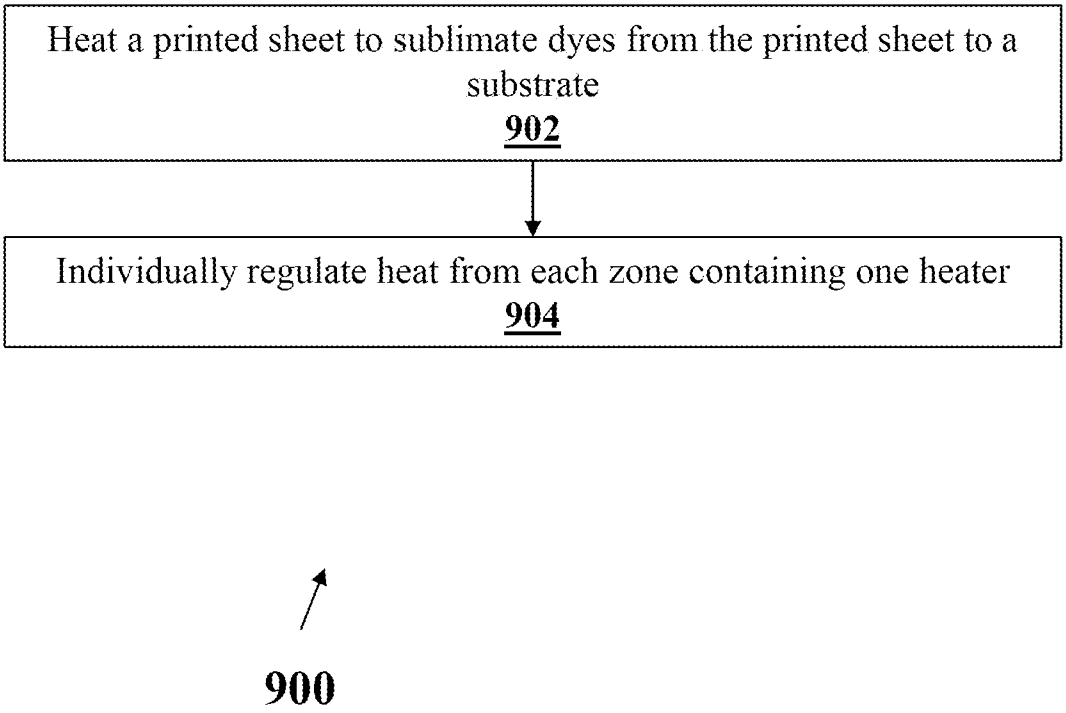
FIG. 9 shows a flow diagram of an illustrative method for dye sublimation, according to an embodiment.

FIG. 9 shows a flow diagram of an illustrative method 900 of dye sublimation, according to an embodiment. It should be understood that the steps of the method 900 described herein are merely illustrative and additional, alternative, and fewer number of steps should also be considered within the scope of this disclosure.

The method 900 may begin at step 902 where a heating component of a dye sublimation apparatus may heat a printed sheet containing an image. The image may be formed using sublimation ink containing sublimation dyes. The sublimation dyes when heated to a temperature may transform directly from a solid state to a gaseous state. The sublimation dyes in a gaseous state may travel to a substrate and get deposited into the substrate in a solid form. The deposited dyes may form an infused image into the substrate. In other words, the image in the printed sheet is imprinted into the substrate through the dye sublimation process. The heating section may include multiple zones.

At step 904, one or more controllers may individually regulate heat from each of the multiple zones. Each zone may contain one heater, such as an electric heater. A corresponding controller, which may be a hardware and/or a software controller may generate control signals and/or software instructions to regulate the amount of electric current passing through the heating element of the heater, thereby regulating the heat generated by the heating element. Such flexibility in generating the heat allows the heating section to maintain a constant temperature to generate a uniform quality infused image into the substrate.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A dye sublimation apparatus for infusing an image on a printed sheet to a substrate, the dye sublimation apparatus comprising:

a non-planar heating surface spaced apart from the printed sheet and comprising a plurality of zones, wherein the non-planar heating surface is configured to indirectly radiate heat toward the printed sheet; and one or more controllers configured to individually regulate heat from each of the plurality of zones, wherein each of the plurality of zones comprises an individually regulated heater, wherein the one or more controllers are further configured to maintain a first temperature range at a first stage of the process of infusing the image into the substrate and maintain a second temperature range at a second stage of the process of infusing the image into the substrate, the first temperature range being different than the second temperature range, and wherein one or more dyes forming the image sublimate such that the one or more dyes travel into the substrate in a gaseous state and deposit into the substrate in a solid state to infuse the image into the substrate during the first stage and the second stage.

2. The dye sublimation apparatus of claim 1, wherein the one or more controllers are further configured to receive a temperature measurement from a thermocouple and utilize the temperature measurement to individually regulate heat from each of the plurality of zones.

3. The dye sublimation apparatus of claim 1, wherein the one or more controllers are further configured to cause a first subset of the plurality of zones near a center of the non-planar heating surface to generate less heat than a second subset of the plurality of zones near a periphery of the non-planar heating surface.

4. The dye sublimation apparatus of claim 1, wherein the non-planar heating surface is stationary.

5. The dye sublimation apparatus of claim 1, wherein the first stage corresponds to a first period of time and the second stage corresponds to a second period of time, the second period of time being after the first period of time.

6. The dye sublimation apparatus of claim 1, wherein the non-planar heating surface containing the plurality of zones is convex with respect to the bed of the dye-sublimation apparatus.

7. The dye sublimation apparatus of claim 1, wherein the non-planar heating surface containing the plurality of zones is concave with respect to the bed of the dye-sublimation apparatus.

8. The dye sublimation apparatus of claim 1, wherein the plurality of zones are less concentrated near a center of the non-planar heating surface compared to a periphery of the non-planar heating surface.

9. The dye sublimation apparatus of claim 1, wherein the one or more controllers are configured to sequentially activate the individually controlled heaters for each of the plurality of zones.

10. The dye sublimation apparatus of claim 1, wherein the first temperature range is lower than the second temperature range.

11. The dye sublimation apparatus of claim 1, wherein each of the plurality of zones comprises a heater, and wherein the plurality of zones further comprises a first inner zone comprising a first inner group and a second outer group, wherein a distance between heaters in the first inner group is greater than a distance between heaters in a second outer group.

12. A method for infusing an image on a printed sheet to a substrate through dye sublimation, the method comprising:

indirectly radiantly heating, by a plurality of heaters on a non-planar heating surface of a dye sublimation apparatus, the printed sheet to sublimate one or more dyes forming the image, such that the one or more dyes travel into the substrate in a gaseous state and deposit into the substrate in a solid state to infuse the image into the substrate, the non-planar heating surface comprising a plurality of zones wherein each of the plurality of zones comprises a heater spaced apart from the printed sheet; and regulating, by one or more controllers of the dye sublimation apparatus, heat from each of the plurality of zones, wherein the non-planar heating surface containing the plurality of zones is convex with respect to the bed of the dye-sublimation apparatus.

13. The method of claim 12, further comprising:

receiving, by the one or more controllers, a temperature measurement from a thermocouple; and individually regulating, by the one or more controllers, heat from each of the plurality of zones based upon the temperature measurement.

14. The method of claim 12, further comprising:

causing, by the one or more controllers, a first subset of the plurality of zones near a center of the non-planar heating surface to generate less heat than a second subset of the plurality of zones near a periphery of the non-planar heating surface.

15. The method of claim 12, wherein the heater is an electrical heater.

16. The method of claim 12, further comprising:

maintaining, by the one or more controllers, a constant or an approximately constant temperature within the non-planar heating surface throughout the process of infusing the image into the substrate by individually regulating heat from each of the plurality of zones.

17. The method of claim 11, further comprising:

maintaining, by the one or more controllers, a first temperature range at a first stage of the process of infusing the image into the substrate; and maintaining, by the one or more controllers, a second temperature range at a second stage of the process of infusing the image into the substrate, the second temperature range being different than the first temperature range.

18. The method of claim 12, wherein the plurality of zones are less concentrated near a center of the non-planar heating surface compared to a periphery of the non-planar heating surface.

19. The method of claim 12, further comprising:

sequentially activating, by the one or more controllers, the heaters of each of the plurality of zones.

20. The method of claim 13, wherein the thermocouple is positioned with a bed of the dye sublimation apparatus.

* * * * *